United States Patent

Anderson et al.

[11] 4,108,540
[45] Aug. 22, 1978

[54] REFRACTOR-REFLECTOR RADIATION CONCENTRATOR

[75] Inventors: Raymond H. Anderson, St. Mary's Point; Dennis F. Vanderwerf, Cottage Grove, both of Minn.

[73] Assignee: Minnesota Mining and Manufacturing Company, St. Paul, Minn.

[21] Appl. No.: 697,017

[22] Filed: Jun. 17, 1976

[51] Int. Cl.² .............................. G02B 3/08; F24J 3/02
[52] U.S. Cl. ................................... 350/211; 350/190; 350/213; 126/270
[58] Field of Search ............... 350/211, 190, 202, 213; 240/106.1; 126/270, 271

[56] References Cited

U.S. PATENT DOCUMENTS

| | | | |
|---|---|---|---|
| 2,531,399 | 11/1950 | Cawein et al. | 350/190 |
| 3,118,437 | 1/1964 | Hunt | 126/270 |
| 3,125,091 | 3/1964 | Sleeper, Jr. | 126/271 |
| 3,203,306 | 8/1965 | Lefferts | 350/211 |
| 3,915,148 | 10/1975 | | 126/271 |

FOREIGN PATENT DOCUMENTS 666,222  2/1952  United Kingdom.

Primary Examiner—Conrad J. Clark
Attorney, Agent, or Firm—Cruzan Alexander; Donald M. Sell; John C. Barnes

[57] ABSTRACT

A small-area focus solar concentrator comprising a linear echelon refractor and a linear echelon reflector. The increments of the refractor are crossed at approximately 90° to the increments of the reflector. The refractor and reflector cooperate to focus solar radiation incident on the front surface of the refractor to a small area focus in front of the refractor.

The refractor-reflector structure permits relatively low cost, high power concentrators using refractor-reflector matrices. Also, the refractor-reflector structure can be used to focus normal or non-normal incident radiation outside the path of the radiation to reduce or eliminate blockage of the radiation by an absorber located at the focus.

25 Claims, 13 Drawing Figures

FIG. 9A
FIG. 9B
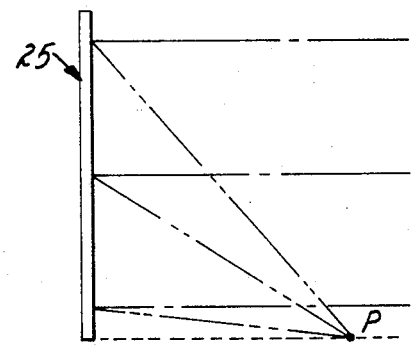
FIG. 10
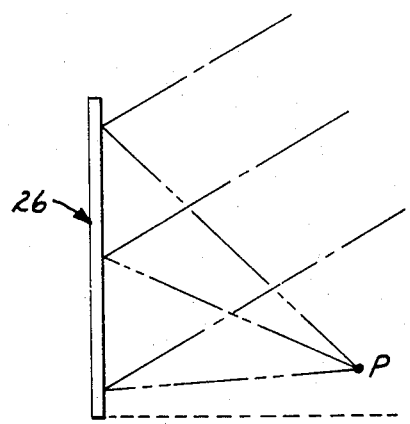
FIG. 11

REFRACTOR-REFLECTOR RADIATION CONCENTRATOR

BACKGROUND OF THE INVENTION

1. Field of the Invention

This invention relates to radiant energy collection apparatus and, in particular, to optical concentrators for solar radiation.

2. Description of the Prior Art

Spheroid or paraboloid reflectors have often been used for concentrating solar radiation to a small or a point focus in solar collectors. However, a large area reflector is required to obtain high heat flux at the focus. Whether formed in one piece or in sections, large area reflectors are generally difficult to make with the requisite accuracy, and are expensive.

Echelon reflectors are an alternative to the spheroid or paraboloid approach. Typically, the echelon reflector uses circular grooves to focus solar rays. Such an annular echelon reflector has the advantage of being a relatively thin, flat panel which can be mass produced accurately. Unfortunately, due to the limitations of the ruling lathes which produce the master for these reflectors, reflector size is limited. Hence, the available power density is also limited.

Linear echelon reflectors or linear echelon refractors have also been used as solar radiation concentrators. This type of reflector or refractor concentrates incident solar radiation to a line focus and is thus useful for tubular absorbers. See, e.g., U.S. Pat. No. 3,915,148 issued Oct. 28, 1975, to Fletcher, which teaches the use of cylindrical Fresnel lenses to focus solar radiation on linear collector or absorber elements. Also, lens and mirror elements have been used cooperatively to focus radiation on a linear collector, as taught in U.S. Pat. No. 3,125,091 issued Mar. 17, 1964, to Sleeper. However, the flux density at a line focus is less than that for a comparable small area or "point" focus and limits the application of such line focus collectors.

As will be appreciated from the foregoing discussion, it is highly desirable to have a solar energy concentrator which combines high flux density with ease of manufacture, even for large area concentrators.

SUMMARY OF THE INVENTION

The present invention relates to a concentrator suitable for focusing radiation to a small area and comprises a linear echelon refractor which comprises the front portion of the concentrator, and a linear echelon reflector which comprises the rear portion of the concentrator, the increments of the reflector being crossed at approximately 90° relative to the increments of the refractor to focus radiation incident on the front portion of the concentrator in front of the concentrator. A programmed matrix of individual concentrator panels can be used to form a large area refractor-reflector concentrator structure which focuses radiation to a high flux density. Also, normal and non-normal incident radiation can be focused outside the path of the incident radiation to reduce or eliminate blockage of the incident radiation by an absorber located at the focus.

BRIEF DESCRIPTION OF THE DRAWING

FIGS. 9A and 9B illustrate exemplary matrix arrangements for, respectively, the refractor and the reflector of the present invention.

FIG. 10 is a schematic representation of offset focusing of normal incident radiation by a concentrator embodying the principles of the present invention.

FIG. 11 schematically illustrates offset focusing of non-normal incident radiation by a concentrator embodying the principles of the present invention.

DETAILED DESCRIPTION

Figure 1:
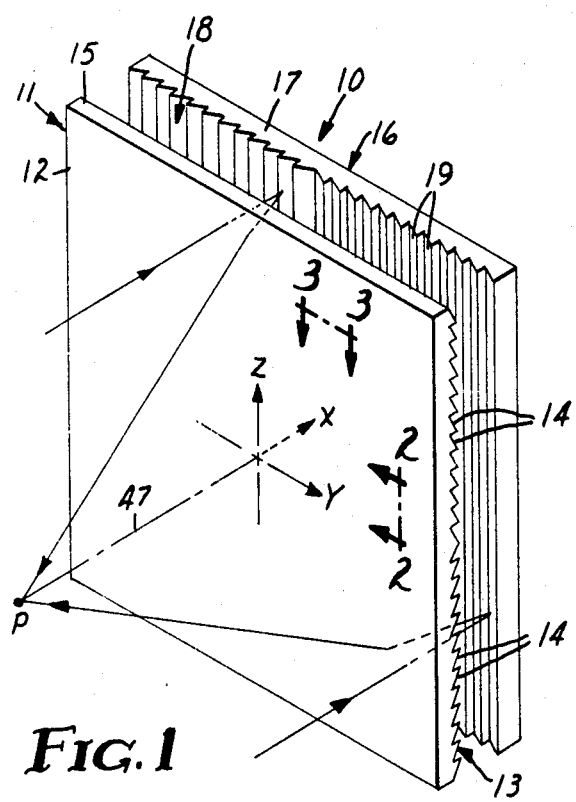
FIG. 1 is a perspective representation of a crossed, linear echelon refractor-linear echelon reflector concentrator which embodies principles of the present invention, schematically showing the small area focusing of incident radiation.

Referring to FIG. 1, there is shown an exemplary optical concentrator panel 10 that embodies the principles of the present invention. The concentrator panel 10 comprises a refractor structure 11 in the form of an optically clear sheet 15 having major surfaces on opposite front and back sides thereof that are formed, respectively, into a smooth surface 12 and a linear echelon refractor 13. The refractor 13 comprises a substantially parallel array of increments 14—14. The concentrator panel 10 further comprises a reflector structure 16 comprising a sheet 17 having a substantially planar, linear echelon reflector 18 formed in the front surface thereof and positioned in opposed spatial relationship to (or contacting) the linear echelon refractor 13. The reflector 18 comprises a substantially parallel array of increments 19—19 which form reflective surfaces. Preferably, the reflector 18 is specularly reflective and can be made reflective in a number of ways well known to those skilled in the art, as by applying metal deposition to previously formed increments 19—19.

With the linear increments 19—19 of reflector 18 crossed (i.e., positioned at an angle of approximately 90°

) with the linear increments 14—14 of the refractor 13 as shown in FIG. 1, the configuration of the refractor increments and the reflector increments can be designed to focus radiation incident upon the smooth front surface 12 of the refractor structure 11 to a small area focus, p, in front of the refractor structure. As used here, "in front of" refers to the three-dimensional space on the incident radiation side of a plane coinciding with the plane of the concentrator and includes, but is not limited to, the space directly in front of the concentrator.

The area of "p" and the percentage of incident radiation focused or "collected" at "p" is determined by factors such as the values of the refractor and the reflector increment angles and the accuracy of manufacture of the linear increments 14—14 and 19—19. Typically, the concentrator provides satisfactory performance if the refractor 13 and reflector 18 are crossed at an angle within the approximate range 90° ±5°.

It should be noted that the linear echelon refractor 13 has the structure of, and could be called, a linear echelon lens. This structure, a linear Fresnel lens, is the analog of a solid cylindrical lens and is capable of focusing radiation to a line focus. As discussed below, the refractor 13 and the reflector 18 are designed to operate as an entity in focusing light, rather than as separate elements having separate line foci which cooperate to provide a point or small area focus. The generic term "refractor" is applied to structure 13 throughout, to avoid the inference of separate elements, separately focused.

Figure 2:
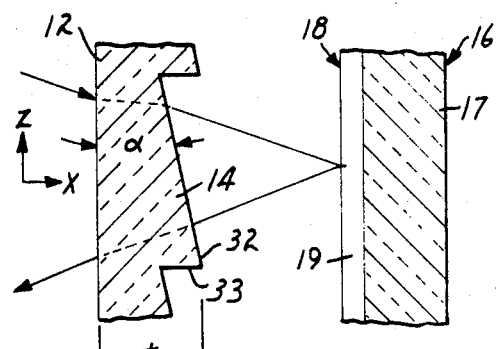
FIG. 2 is a vertical cross-sectional view, taken along the lines 2—2 of FIG. 1, schematically tracing the vertical path of a meridional ray which passes through the concentrator.
Figure 3:
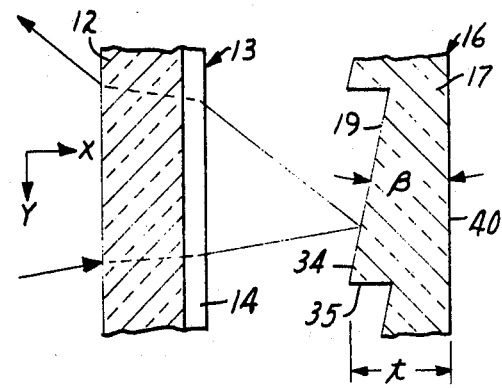
FIG. 3 is a horizontal cross-sectional view, taken along the lines 3—3 of FIG. 1, schematically tracing the horizontal path of a meridional ray which passes through the concentrator.

The focusing action of the optical concentrator panel 10 can be examined by simplified, meridional ray traces through single linear increments 14 and 19 in the X-Z and X-Y planes, respectively. As shown in FIG. 2, in the X-Z plane the incident ray is refracted at the air interface of the smooth front surface 12 and at the air interface of refractor increment 14; then is reflected by the reflector linear increment 19; and is refracted at the air interfaces of the refractor increment 14 and the smooth front surface 12 in traversing back through the refractor structure 11 to the focus p. As shown in FIG. 3, in the X-Y plane the ray is refracted at the air interfaces of planar surface 12 and refractor increment 14; then reflected at the reflector increment 19 for refraction at the refractor increment 14 and planar surface 12 in traversing the refractor structure 11 to the focus p.

These simplified, two-dimensional ray traces are illustrative of the working of the concentrator panel 10 and are also useful in designing the refractor increment angles and the reflector increment angles. Referring to FIG. 2, the refractor increment angle is angle α subtended between surface 32 and surface 12. Similarly, referring to FIG. 3, the reflector increment angle is β subtended between surface 34 and surface 40. The light ray paths through the concentrator and, thus, the focusing of the light rays are preferably controlled or altered by varying the angles α and β of the individual refractor and reflector increments. Those skilled in the art will appreciate that it is frequently desirable to optimize the initial values of angles α and β provided by a two-dimensional ray trace using a skew or three-dimensional ray trace.

Figure 4:
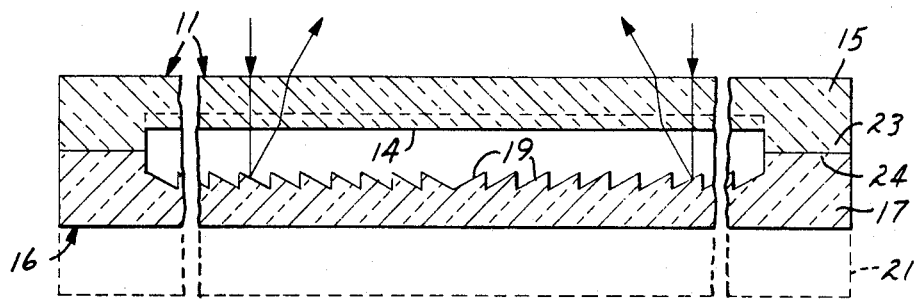
FIG. 4 is a cross-sectional view of an alternative embodiment of the present invention, a concentrator panel element which is sealed about the edges.

Referring again to FIG. 1, the inward facing design of the refractor 13 and reflector 18 decreases degradation of the refractor and reflector by wind, rain, sun, etc., and, because the external surfaces are smooth, facilitates cleaning the panel. The panel can be sealed from the ambient. For example, the adjacent, inward-facing refractor structure 11 and reflector structure 16 can be joined at mating, non-incremental areas formed in the back surface of the optically clear sheet 15 and in the front surface of the reflector sheet 17. This is illustrated in FIG. 4, where the refractor and reflector structures are shown as having mating borders 23 and 24 which can be joined by means such as adhesive (not shown). Also, a support panel 21 (indicated by the dotted outline in FIG. 4) can be affixed to the back of the reflector structure 16 so that the reflector structure and the refractor structure 11 can be thin elements and need not be self-supporting.

Figure 5:
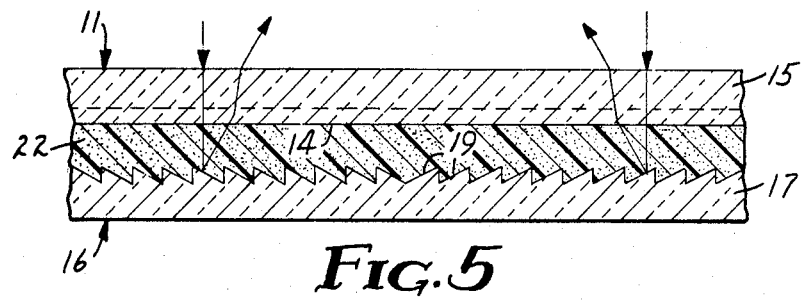
FIG. 5 is a cross-sectional view of another alternative embodiment of the present invention, a concentrator panel element having an optically clear adhesive occupying the space between the refractor and the reflector.

Alternatively, as shown in FIG. 5, an optically clear polymeric adhesive 22 which has a lower index of refraction than the clear sheet 15 of positive refractor 13 (or a higher index of refraction than sheet 15 when the refractor is negative) can be used to fill the space between the inward facing refractor increments 14—14 and reflector increments 19—19 and to attach the refractor to the reflector. For example, if the optically clear sheet 15 is cellulose acetate butyrate (CAB), a suitable material 22 is polyperfluorooctylsulfonamidoethyl acrylate. This approach eliminates the borders 23 and 24 (FIG. 4) and eliminates air interfaces at the refractor and the reflector.

Figure 6:
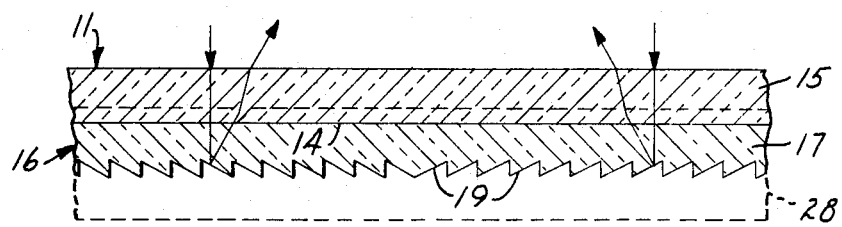
FIG. 6 is a cross-sectional view of another alternative embodiment of the present invention, a concentrator panel element having the reflector structure formed on an outer surface.

In still another alternative configuration, as shown in FIG. 6, the reflector increments 19—19 are on the outside surface of the concentrator panel. In this embodiment, sheet 17 is clear to permit radiation to traverse the sheet. A support panel 28 (indicated by dotted outline) can be affixed to the back of the reflector structure 16.

Figure 7:
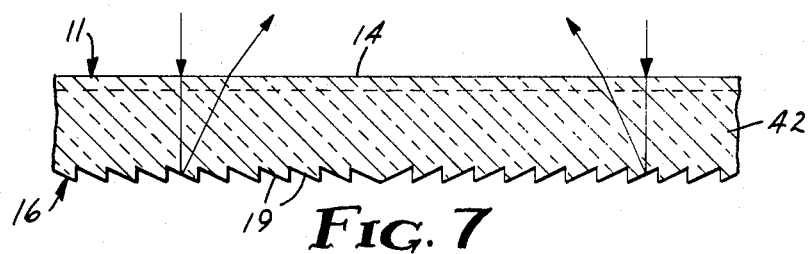
FIG. 7 is a cross-sectional view of still another alternative embodiment of the present invention, a concentrator panel in which the refractor and the reflector are formed in outer surfaces of a single, optically clear sheet.

FIG. 7 shows another alternative configuration, one in which the refractor structure 11 and the reflector structure 16 are formed in a single clear sheet 42. That is, the refractor increments 14—14 and the reflector increments 19—19 are formed in opposite sides of the sheet 42. This simple configuration eliminates air interfaces between the refractor and reflector structures.

Figure 8:
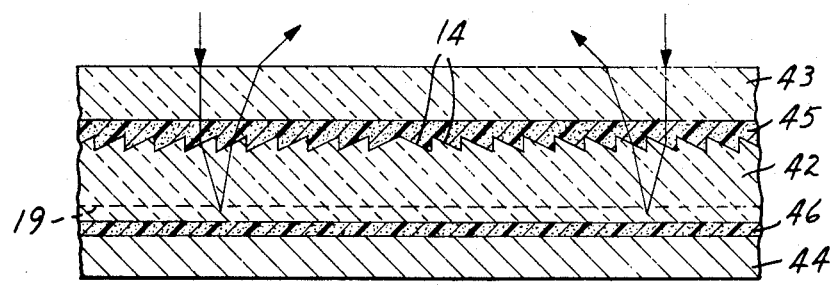
FIG. 8 is a cross-sectional view, taken at 90° to the view shown in FIG. 7, of a single sheet concentrator panel of the type shown in FIG. 7 having protective members covering the refractor and reflector increments.

Referring to FIG. 8, the sheet 42 can be encapsulated by a protective structure. The illustrated protective structure comprises panels 43 and/or 44 which have flat outer surfaces to facilitate cleaning. The panels can be affixed to the refractor or reflector in several ways. As shown by way of example in FIG. 8, the flat interior surface of the clear protective panel 43 is affixed to the refractor by an optically clear polymeric adhesive 45, while the flat interior surface of panel 44 is attached to the reflector by an adhesive 46, which need not be optically clear.

The above-described concentrator panel design is adaptable to the manufacture of large area concentrator structures using programmed matrices of individual refractor and reflector elements. The individual elements are derived from the refractor structure 11 and the reflector structure 16 of concentration panel 10 (FIG. 1). These matrix structures are useful for high power applications, such as thermal engines.

As shown in FIGS. 9A and 9B, typical cooperating refractor matrix 31 and reflector matrix 36 utilize rows and columns, respectively, of refractor and reflector elements. The refractor matrix 31 of FIG. 9A utilizes rows of individual refractor elements 1-6 which are parallel to the horizontal axis of symmetry 37. The reflector matrix 36 of FIG. 9B utilizes columns of linear reflector elements A-F which are parallel to the vertical axis of symmetry 38.

Corresponding rows and columns on opposite sides of the axes 37 and 38 are reversed relative to one another. That is, the axes 37 and 38 divide their respective matrices 31 and 36 into mirror image halves. When the refractor matrix 31 and the reflector matrix 36 are brought together with the axes 37 and 38 crossed, the refractor-reflector matrices cooperate to provide small area focusing of incident solar radiation in the same manner as the single element concentrator panel 10 of FIG. 1. It will be appreciated that these arrangements are illustrative only, for other arrangements will be readily devised by those skilled in the art.

An 11 in. × 11 in. concentrator panel 10 was built to the design of FIG. 1. The sheets 15 and 17 were polymethyl methacrylate (PMMA;D$n$ = 1.49) and had 50 linear increments per inch measured along a line perpendicular to the length of the increments. The thickness, $t$, of the sheets was 0.060 inch. Vapor deposition was used to coat the surfaces 34 (FIG. 3) with a specularly reflective, aluminum coating. The angles $\alpha$ and $\beta$ were designed via ray trace analysis to provide a collection efficiency of 0.95. That is, angles $\alpha$ and $\beta$ were used that established a diameter of the small area focus, or "containment circle" $p$, for which 95% of the transmitted rays pass through the focus. This diameter is about 0.75 inch for the 11 in. × 11 in. concentrator panel.

A large area, e.g., 11 ft. × 11 ft., concentrator can be readily assembled using a plurality of 11 in. × 11 in. concentrator panels in the matrix design of FIGS. 9A and 9B. Based upon the 0.75 inch diameter containment circle or focus for the 11 in. × 11 in. panel 10, a focus radius of about 4.0 inches would provide a collection efficiency of 0.95 for the 11 ft. × 11 ft. panel matrix. The power in watts within the focus can be estimated by:

$W = H \times AC \times TR \times CE$, where $H$ = solar flux density; assume approximately 100 watts per square foot incident on panel;

$AC$ = concentrator panel area;

$TR$ = transmission and reflection efficiency, 0.96 transmission per interface and 0.88 per reflection provides $TR = (0.96)^4 (0.88) = 0.75$;

$CE$ = collection efficiency, designed to be 0.95.

For an 11 ft. × 11 ft. panel that concentrates 95% of the transmitted solar radiation within a 4-inch radius containment circle at 11 ft., the power is then approximately:

$W = 100 \times 121 \times 0.75 \times 0.95 = 8.5$ kilowatt.

The matrix configuration of the present invention is not limited to that shown in FIGS. 9A and 9B. For example, the number of panels in the rows (columns) could be reduced by using extruded lenses of greater width (height).

The crossed linear solar panel described above may be designed to focus normal solar radiation (incoming rays which are incident at an angle of 90° to the panel) to a point on an optical axis 47 (FIG. 1) which is directed perpendicular to the panel and passes through the center of the panel. In this case, the focus is within the path of the perpendicular or normal incident rays and the design is termed "normal" focus. However, other design configurations are possible which diminish or avoid the resultant blocking of incoming radiation by the flux absorber (not shown). For example, as shown schematically in FIG. 10, solar concentrator panel or panel matrix 25 (using refractor-reflector matrices derived from matrices 31 (FIG. 9A) and 36 (FIG. 9B) or an individual concentrator based upon panel 10) directs normal radiation to a focus "$p$" which is outside of or offset from the incident rays and thus out of the path of the incident radiation. This reduces or eliminates blockage. The design is termed "normal off-set" focus.

Alternatively, as shown in FIG. 11, a solar panel or panel matrix 26 can be programmed for focusing non-normal radiation to a focus which is offset to eliminate receiver blockage of the non-normal radiation. This design is "non-normal offset". Of course, "non-normal" focus design, i.e., focus within the path of the incident, non-normal radiation is also possible.

Figure 12:
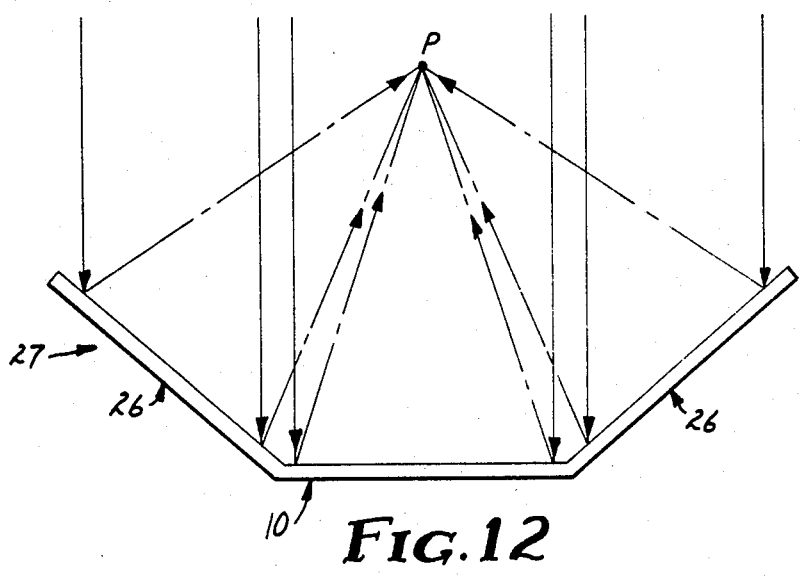
FIG. 12 schematically illustrates combination focusing of normal and non-normal incident radiation by a concentrator center panel and two concentrator side panels.

Combinations of normal, normal offset, non-normal and non-normal offset focus designs are possible. As shown by way of example in FIG. 12, combination concentrator 27 uses normal center panel 10 and non-normal offset side panels 26—26.

It should be noted that, unlike the matrices 31 and 36 shown in FIGS. 9A and 9B, the non-normal and offset matrix designs usually will not have mirror-image halves. This is because, and as is evident from FIGS. 10 and 11, the light-directing requirements for the non-normal and offset designs are non-symmetrical.

It will be appreciated by those skilled in the art that incorporation of designs such as offset or non-normal focus designs in one piece, prior art concentrators may require complex shapes and difficult and expensive forming processes. In addition, because of radial symmetry, the circular Fresnel reflector cannot direct non-normal radiation to an offset focus as per FIG. 11. However, offset, non-normal and other design configurations can be readily achieved using either an individual concentrator panel or a panel matrix incorporating the principles of the present invention.

Having thus described a preferred and alternative embodiments of the present invention, including a preferred example thereof, what is claimed is:

1. An optical concentrator having front and rear portions for collecting and focusing incident radiation into a small area focus in front of the concentrator, said front portion of the concentrator having a linear echelon refractor formed therein; said rear portion of the concentrator having a linear echelon reflector formed therein; and the concentrator further comprising means for joining said refractor and said reflector to form a refractor-reflector structure having the increments of said linear echelon reflector crossed at approximately 90° relative to the increments of said linear echelon refractor for directing radiation incident on the front portion of the concentrator to said focus in front of the concentrator.

2. The concentrator of claim 1, further comprising at least a second crossed refractor-reflector structure adapted to direct radiation incident on the front portion thereof to the focus in front of the concentrator.

3. The concentrator of claim 2, wherein said first mentioned refractor-reflector structure has a normal focus and said second refractor-reflector has a non-normal offset focus.

4. The concentrator of claim 2, wherein said first mentioned refractor-reflector has a normal focus and said second refractor-reflector structure has a normal offset focus.

5. The concentrator of claim 4, wherein said joining means comprises optically clear material between said linear echelon refractor and said linear echelon reflector which affixes said planar sheet to said reflector structure.

6. The concentrator of claim 2, said front portion comprising a planar sheet of optically clear material having first and second major surfaces on opposite sides thereof, said first major surface being substantially smooth and said second major surface having a linear echelon refractor formed therein; and said rear portion comprising a reflector structure having at least a first substantially planar major surface and a linear echelon reflector formed in said first major surface of the reflector structure.

7. The concentrator of claim 6, wherein said major surfaces are approximately 11 in. by 11 in. and wherein said refractor increments and said reflector increments number approximately 50 per inch measured along a line extending perpendicular to the length of the increments, and said planar sheet being approximately 0.060 inches thick for providing a collection efficiency of 0.95 within a focus of approximately 0.75 inch diameter.

8. The concentrator of claim 6, wherein said joining means comprises mating, non-incremental portions formed in said second major surface of the planar sheet and in said first major surface of the reflector structure.

9. The concentrator of claim 8, wherein said major surfaces are approximately 11 in. by 11 in. and wherein said refractor increments and said reflector increments number approximately 50 per inch measured along a line extending perpendicular to the length of the increments, and said planar sheet being approximately 0.060 inches thick for providing a collection efficiency of 0.95 within a focus of approximately 0.75 inch diameter.

10. The concentrator of claim 8, wherein said major surfaces are approximately 11 in. by 11 in. and wherein said refractor increments and said reflector increments number approximately 50 per inch measured along a line extending perpendicular to the length of the increments, and said planar sheet being approximately 0.060 inches thick for providing a collection efficiency of 0.95 within a focus of approximately 0.75 inch diameter.

11. The concentrator of claim 6, wherein said reflector structure is an optically clear sheet having a second substantially planar major surface on the opposite side of said structure from said first major surface, said second major surface of the reflector structure being closer to said planar sheet than said first major surface of the reflector structure.

12. The concentrator of claim 11, wherein said major surfaces are approximately 11 in. by 11 in. and wherein said refractor increments and said reflector increments number approximately 50 per inch measured along a line extending perpendicular to the length of the increments, and said planar sheet being approximately 0.060 inches thick for providing a collection efficiency of 0.95 within a focus of approximately 0.75 inch diameter.

13. The concentrator of claim 2, wherein said joining means comprising an optically clear sheet having front and rear major surfaces, said linear echelon refractor and said linear echelon reflector being formed, respectively, in said front major surface and said rear major surface.

14. The concentrator of claim 13, wherein at least one of said linear echelon refractor and said linear echelon reflector having a protective covering thereover.

15. The concentrator of claim 1, said front portion comprising a planar sheet of optically clear material having first and second major surfaces on opposite sides thereof, said first major surface being substantially smooth and said second major surface having a linear echelon refractor formed therein; and said rear portion comprising a reflector structure having at least a first substantially planar major surface and a linear echelon reflector formed in said first major surface of the reflector structure.

16. The concentrator of claim 15, wherein said joining means comprises mating, non-incremental portions formed in said second major surface of the planar sheet and in said first major surface of the reflector structure.

17. The concentrator of claim 16, wherein said major surfaces are approximately 11 in. by 11 in. and wherein said refractor increments and said reflector increments number approximately fifty per inch measured along a line extending perpendicular to the length of the increments, and said planar sheet being approximately 0.060 inches thick for providing a collection efficiency of 0.95 within a focus of approximately 0.75 inch diameter.

18. The concentrator of claim 15, wherein said joining means comprises optically clear material between said linear echelon refractor and said linear echelon reflector which affixes said planar sheet to said reflector structure.

19. The concentrator of claim 18, wherein said major surfaces are approximately 11 in. by 11 in. and wherein said refractor increments and said reflector increments number approximately 50 per inch measured along a line extending perpendicular to the length of the increments, and said planar sheet being approximately 0.060 inches thick for providing a collection efficiency of 0.95 within a focus of approximately 0.75 inch diameter.

20. The concentrator of claim 15, wherein said reflector structure is an optically clear sheet having a second substantially planar major surface on the opposite side of said structure from said first major surface, said second major surface of the reflector structure being closer to said planar sheet than said first major surface of the reflector structure.

21. The concentrator of claim 20, wherein said major surfaces are approximately 11 in. by 11 in. and wherein said refractor increments and said reflector increments number approximately 50 per inch measured along a line extending perpendicular to the length of the increments, and said planar sheet being approximately 0.060 inches thick for providing a collection efficiency of 0.95 within a focus of approximately 0.75 inch diameter.

22. The concentrator of claim 15, wherein said major surfaces are approximately 11 in. by 11 in. and wherein said refractor increments and said reflector increments number approximately 50 per inch measured along a line extending perpendicular to the length of the increments, and said planar sheet being approximately 0.060 inches thick for providing a collection efficiency of 0.95 within a focus of approximately 0.75 inch diameter.

23. The concentrator of claim 1, said joining means comprising an optically clear sheet having front and rear major surfaces, said linear echelon refractor and said linear echelon reflector being formed, respectively, in said front major surface and said rear major surface.

24. The concentrator of claim 23, at least one of said linear echelon refractor and said linear echelon reflector having a protective covering thereover.

25. A concentrator for focusing radiation to a small area of high flux intensity and comprising at least two concentrator panels, each panel comprising:
a planar sheet of optically clear material having first and second major surfaces formed, respectively, in front and back sides thereof, the first major surface being substantially smooth and the second major surface having a linear echelon lens formed therein;

a planar, linear echelon reflector corresponding to the planar sheet of optically clear material, the increments of the linear echelon reflector being crossed at approximately 90° to the increments of the linear echelon lens; and the linear echelon lens cooperating with the corresponding linear echelon reflector to direct radiation incident on the first, smooth major surface of the planar sheet to a focus in front thereof.

* * * * *

UNITED STATES PATENT AND TRADEMARK OFFICE
CERTIFICATE OF CORRECTION

PATENT NO. : 4,108,540

DATED : August 22, 1978

INVENTOR(S) : Raymond H. Anderson and Dennis F. Vanderwerf

It is certified that error appears in the above-identified patent and that said Letters Patent are hereby corrected as shown below:

Column 5, line 15, change "$D_n$" to -- $n_D$ --;

Signed and Sealed this

Fifth Day of June 1979

[SEAL]

Attest:

RUTH C. MASON
Attesting Officer

DONALD W. BANNER
Commissioner of Patents and Trademarks